US007496058B2

(12) United States Patent
Kim et al.

(10) Patent No.: US 7,496,058 B2
(45) Date of Patent: Feb. 24, 2009

(54) METHOD OF TRANSMITTING CONTROL INFORMATION FOR REVERSE LINK PACKET TRANSMISSION

(75) Inventors: Ki Jun Kim, Seoul (KR); Young Woo Yun, Seoul (KR); Kyoo Jin Han, Anyang-si (KR); Sang Woo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 1033 days.

(21) Appl. No.: 10/841,826

(22) Filed: May 10, 2004

(65) Prior Publication Data

US 2004/0266466 A1 Dec. 30, 2004

(30) Foreign Application Priority Data

May 10, 2003 (KR) ..................... 10-2003-0029660

(51) Int. Cl.
*H04B 7/216* (2006.01)

(52) U.S. Cl. .................... 370/310.1; 370/260; 370/394; 370/473; 455/509

(58) Field of Classification Search ................. 370/321, 370/328, 342, 260, 310.1, 394, 473; 455/442, 455/509
See application file for complete search history.

(56) References Cited

U.S. PATENT DOCUMENTS

| | | | | |
|---|---|---|---|---|
| 6,847,818 | B1 * | 1/2005 | Furukawa | 455/442 |
| 7,133,379 | B2 * | 11/2006 | Yoshii et al. | 370/328 |
| 7,317,700 | B2 * | 1/2008 | Hwang | 370/328 |
| 2002/0060997 | A1 | 5/2002 | Hwang | 370/335 |
| 2002/0155853 | A1 | 10/2002 | Lee et al. | 455/522 |
| 2003/0185159 | A1 * | 10/2003 | Seo et al. | 370/278 |
| 2004/0100921 | A1 * | 5/2004 | Khan | 370/321 |
| 2004/0160933 | A1 * | 8/2004 | Odenwalder et al. | 370/342 |

FOREIGN PATENT DOCUMENTS

| | | | |
|---|---|---|---|
| CN | 1354572 | A | 6/2002 |
| CN | 1383335 | A | 12/2002 |

* cited by examiner

*Primary Examiner*—Gerald Gauthier
(74) *Attorney, Agent, or Firm*—Ked & Associates LLP

(57) ABSTRACT

In order to carry out a dedicated type rate control on a reverse link data channel having HARQ applied thereto, rate control bit and ACK/NAK information should be delivered via MAC channel as well as reverse power control information and DRCLock. The present invention provides a method of delivering rate control bit and ACK/NAK information to a mobile station from a base station via MAC channel. Moreover, the present invention provides a MAC channel structure for delivering control information via MAC channel.

19 Claims, 5 Drawing Sheets

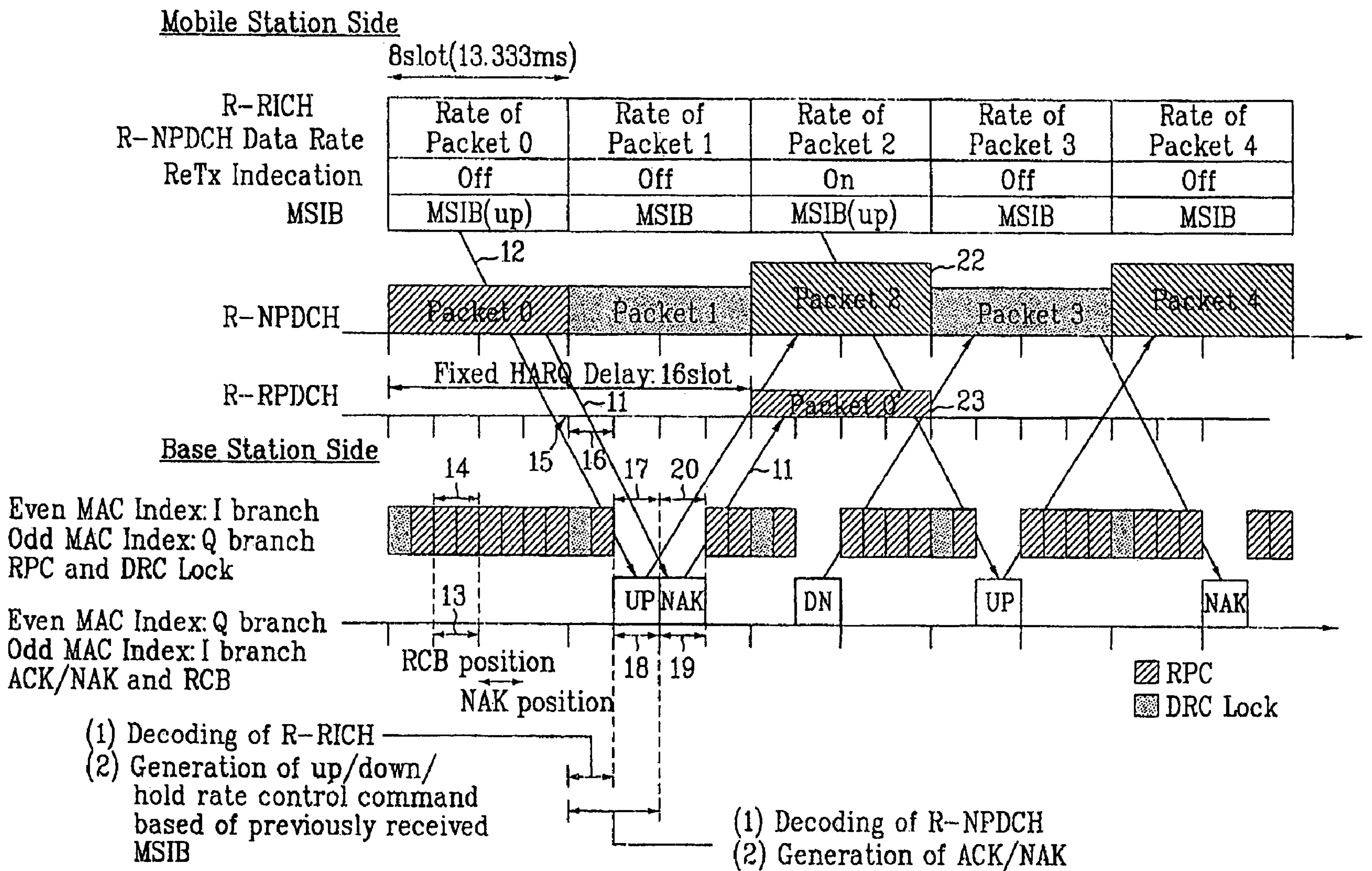
FIG. 2
Mobile Station Side
8slot(13.333ms)
R-RICH
R-NPDCH Data Rate
ReTx Indecation
MSIB
Rate of Packet 0
Off
MSIB(up)
Rate of Packet 1
Off
MSIB
Rate of Packet 2
On
MSIB(up)
Rate of Packet 3
Off
MSIB
Rate of Packet 4
Off
MSIB
12
22
R-NPDCH
Packet 0
Packet 1
Packet 2
Packet 3
Packet 4
Fixed HARQ Delay:16slot
11
R-RPDCH
Packet 0
23
Base Station Side
14
15
16
17
20
11
Even MAC Index: I branch
Odd MAC Index: Q branch
RPC and DRC Lock
13
UP
NAK
DN
UP
NAK
Even MAC Index: Q branch
Odd MAC Index: I branch
ACK/NAK and RCB
RCB position
NAK position
18
19
RPC
DRC Lock
(1) Decoding of R-RICH
(2) Generation of up/down/ hold rate control command based of previously received MSIB
(1) Decoding of R-NPDCH
(2) Generation of ACK/NAK

METHOD OF TRANSMITTING CONTROL INFORMATION FOR REVERSE LINK PACKET TRANSMISSION

CROSS-REFERENCE TO RELATED APPLICATIONS

This application claims the benefit of Korean Application No. 10-2003-0029660 filed on May 10, 2003, which is hereby incorporated by reference.

BACKGROUND OF THE INVENTION

1. Field of the Invention

The present invention relates to a method of transmitting control information for reverse link packet transmission in mobile communications, and more particularly, to a method of transmitting data rate control information and ACK/NAK signal via MAC(Medium Access Control) channel.

2. Discussion of the Related Art

CDAM 2000 mobile communications system has been developed to fit applications requesting voice call or continuous data transmission. As a demand for packet data services lately increases, the first generation mobile communications system of CDMA 200, 1 x EV-DO (Evolution-Data Only), has been developed to support such a demand.

The 1xEV-DO system is designed to support a packet data service on a frequency bandwidth independent from that for a voice service only. Hence, AMC (Adaptive Modulation and Coding) and HARQ(Hybrid Automatic Repeat Request) are applied to a forward link of the 1xEV-DO system. In HARQ, a baseband packet is divided into a plurality of subpackets and retransmission is requested by subpacket unit.

In reverse link of the 1xEV-DO system, a data rate is controlled via RAB (Reverse Activity Bit). Namely, in case that each terminal transmits data via reverse link, data transmission starts at a data rate of 9,600bps that is the minimum and whether to increase the data rate is then decided by itself via p-persistent test. In doing so, a probability value changing the data rate can be differently defined according to the data rate. Generally, if a current data rate is relatively high, the probability value increasing the current data rate is defined by a small value. On the contrary, if a current data rate is relatively low, the probability value increasing the current data rate is defined by a great value.

A base station checks a state of reverse link. The base station transmits RAB signal meaning ‘busy’ to terminals in common if deciding that reverse load is excessive. If there is a margin in load of reverse link, the base station does not transmit the RAB signal. Having received the RAB signal meaning ‘busy’, each of the terminals performs the p-persistent test by itself and then decides whether to lower the current data rate by one step according to the corresponding result.

MAC(Medium Access Control) channel of the related art 1xEV-DO system is a channel to transmit control signals for the data rate control and the reverse link power control to a terminal. The MAC channel consists of three sub-channels, RPC channel, DRCLock channel, and RA channel.

The RA(Reverse Activity) channel transmits RAB(Reverse link Activity Bit) stream. The MAC channel consists of BPSK modulated into a specific phase (I- or Q-phase) of a carrier by Walsh channel that orthogonally covers. Each Walsh channel shown in Equation 1 and Equation 2 is distinguished by MAC index value between 0~63 and can be defined by unique 64—ary Walsh cover and modulation phase.

$$W_{i/2}^{64} \text{ for } i=0, 2, \ldots, 62 \quad \text{[Equation 1]}$$

$$W_{(i-1)/2+32}^{64} \text{ for } i=1, 3, \ldots, 63 \quad \text{[Equation 2]}$$

In this case, ‘i’ is MAC index value. In-phase (i) modulation phase is allocated to MAC channel having even MAC index value. Quardrature-phase (Q) modulation phase is allocated to MAC channel having odd MAC index value. MAC symbol Walsh cover transmits a burst of 64-chips length four times per slot. Theses bursts, which are attached to front and rear of a pilot burst of each slot, are transmitted. Symbol of each MAC channel is transmitted over one of the Walsh channels. The Walsh channel is scaled to uniformly maintain total transmit power.

FIG. 1 is a block diagram of MAC channel according to a related art.

Referring to FIG. 1, MAC channel consists of RPC bit for reverse link rate control, DRCLock channel, and RAB, in which TDM (Time Division Multiplexing) is carried out on the RPC bit, DPRCLock channel, and RAB. The MAC channel is demodulated to transmit by BPSK via I-channel (even MAC index) or Q-channel (odd MAC index) according to the MAC index.

MAC channel is defined in forward link of the current 1xEV-DO system, and various kinds of necessary information are transmitted via MAC channel for the reverse control. The MAC channel allocated to one user includes three sub-channels in forward link of the current 1xEV-DO system. Namely, it includes RPC channel used for the reverse power control, RAB channel used for the rate control of reverse link, and DRCLock channel for the base station to feed back to the terminal whether to enable to decode DRC (data rate) the corresponding terminal has transmitted. Currently, each of the entire MAC channels available in use consists of the three sub-channels.

For the data rate control of reverse link of the 1xEV-DO system, RAB is generated from the base station based on total interference amount estimated by the base station. Namely, without considering a channel status of each terminal, RAB is generated in viewpoint of the base station. Moreover, as mentioned in the foregoing description, each terminal decreases or increases the reverse link data rate according to the RAB transmitted from the base station and the and p-persistent test, whereby the entire terminals raise or lower their data rates with the same probability regardless of the channel status of each channel.

However, the reverse data rate control in the current 1xEV-DO system decides to increase or decrease the data rate without considering the channel status or data rate of the terminal. Hence, data transmission is inefficiently performed to reduce throughput thereof.

SUMMARY OF THE INVENTION

Accordingly, the present invention is directed to a method of transmitting control information for reverse link packet transmission on MAC channel that substantially obviates one or more of the problems due to limitations and disadvantages of the related art.

An object of the present invention, which has been devised to solve the foregoing problem, lies in providing a method of transmitting control information for reverse link packet transmission on MAC channel.

Additional features and advantages of the invention will be set forth in the description which follows, and in part will be apparent to those having ordinary skill in the art upon examination of the following or may be learned from a practice of the invention. The objectives and other advantages of the invention will be realized and attained by the subject matter particularly pointed out in the specification and claims hereof as well as in the appended drawings.

To achieve these objects and other advantages in accordance with the present invention, as embodied and broadly described herein, there is provided, in reverse link packet data transmission on MAC channel with period between a base station and a mobile station using hybrid automatic repeat request (HARQ), a method of transmitting control information according to the present invention includes the steps of transmitting reverse power control information in a first slot section to the mobile station, making a decision of whether to increase or decrease a data rate of a reverse link packet using the control information received from the mobile station and transmitting rate control information corresponding to the decision in a second slot section, and decoding a sub-packet received from the mobile station and transmitting information of a success/failure result of decoding the sub-packet in a third slot section.

In another aspect of the present invention, there is provided, in reverse link packet data transmission with period between a base station and a mobile station, a method of transmitting control signals includes the steps of receiving state information of the mobile station via a reverse rate indication channel (R-RICH), generating a rate control bit (RCB) using the state information of the mobile station, transmitting the RCB to the mobile station via a medium access control (MAC) channel, receiving a sub-packet via a reverse packet data channel (R-PDCH), decoding the received sub-packet, and transmitting acknowledgement/negative acknowledgement (ACK/NAK) information to the mobile station according to a result of decoding the received sub-packet via the MAC channel.

In another aspect of the present invention, there is provided, in a reverse link packet data transmitting method having HARQ applied thereto, a method of transmitting reverse link packet data includes the steps of transmitting state information of a mobile station via a reverse rate indication channel (R-RICH), receiving data rate control information transmitted from a base station via a medium access control (MAC) channel, transmitting a sub-packet via a reverse packet data channel(R-PDCH) according to the data rate control information, receiving acknowledgement/negative acknowledgement(ACK/NAK) information via the MAC channel, and retransmitting the sub-packet if the NAK information is received.

Therefore, the present invention provides a dedicate type rate control method via MAC channel in the reverse link packet data transmission having HARQ applied thereto.

It is to be understood that both the foregoing explanation and the following detailed description of the present invention are exemplary and illustrative and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram of a control information transmitting method according to a first embodiment of the present invention;

DETAILED DESCRIPTION OF THE PREFERRED EMBODIMENT

Figure 1:
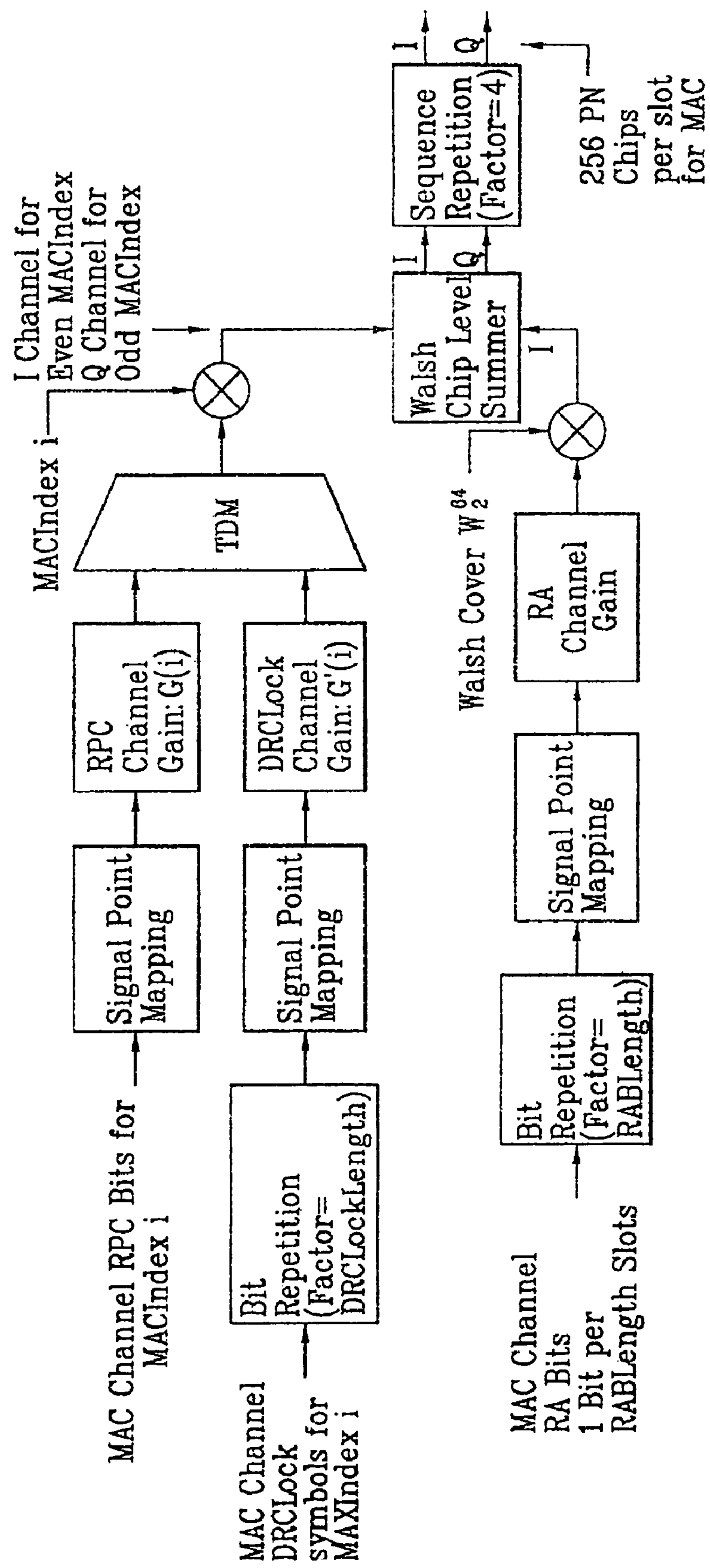
FIG. 1 is a block diagram of MAC channel according to a related art.

Reference will now be made in detail to the preferred embodiment of the present invention, examples of which are illustrated in the accompanying drawings. Throughout the drawings, like elements are indicated using the same or similar reference designations.

Energy Reduction HARQ(Hybrid Automatic Repeat Request) or general HARQ can be applied to packet data transmission in reverse link. Meanwhile, a dedicated type reverse link data rate control method can be applied to packet data transmission in reverse link. Namely, a terminal decides a reverse link data rate at a time point of transmitting each packet and divides one packet into at least one or more sub-packets to transmit via several times. Meanwhile, data rate information is transmitted via a separate control channel. Moreover, ACK(acknowledgement) or NAK (negative acknowledgement) signal is transmitted.

First of all, a length of one sub-packet that is a basic transmission unit of the reverse link can be one of 4-slots (4*1.666ms), 8-slots (8*1.666ms), and 16-slots (16*1.666ms). A first embodiment of the present invention assumes that a length of one sub-packet is 8-slots for convenience of explanation. Yet, the sub-packet length is not fixed but decided arbitrarily.

FIG. 2 is a diagram of a control information transmitting method according to a first embodiment of the present invention, in which energy reduction HARQ is assumed.

Referring to FIG. 2, R-NPDCH (Reverse New Packet Data Channel) in reverse link is a channel for transmitting new packet. R-RPDCH (Reverse Retransmission Packet Data Channel) in reverse link is a channel for retransmitted packet. And, R-RICH (Reverse Rate Indication Channel) is a channel for informing a base station of a data rate of packet that is being transmitted via R-NPDCH.

One of symbols of the R-RICH is used as MSIB (Mobile Status Information Bit) that is a bit indicating a buffer state of terminal and a surplus state of power. By considering the buffer state of terminal and the surplus state of power, if it is judged that the data rate can be increased by one step higher than a current step, the terminal sets the MSIB to ‘up’ to transmit to a base station. Moreover, another symbol of the R-RICH informs whether a current transmission includes the retransmitted sub-packet.

Referring to FIG. 2, the terminal transmits a data rate of packet 0 via R-RICH (S11) while retransmitting the packet 0 via R-NPDCH (S12). Meanwhile, By considering a current buffer state of terminal and the surplus state of power, if it is judged that the data rate can be increased by one step higher than the data rate of the packet 0, the terminal sets the MSIB to ‘up’ to transmit via R-RICH.

The base station decodes R-RICH to acquire MSIB information, geometry information of the terminal, and the like and then decides whether to raise the reverse link data rate of the terminal based on the acquired information. As a result of the decision, if it is necessary to raise the data rate, the base station generates RCB (Rate Control Bit) meaning ‘UP’ to transmit to the terminal. Otherwise, the base station generates RCB (Rate Control Bit) meaning 'DOWN' to transmit to the terminal.

One of three values can be given to the RCB. Intending to raise the reverse link data rate, the base station transmits 'UP' signal that can be mapped to '+1' signal point. Meanwhile, intending to lower the reverse link data rate, the base station transmits 'DOWN' signal that can be mapped to '−1' signal point. Intending to maintain a current data rate, the base station transmits 'HOLD' command. In doing so, no signal may be transmitted.

RCB information is transmitted to a terminal via MAC channel. In doing so, QPSK(Quadrature Phase Shift key) modulation is used as a method of transmitting the RCB information in the first embodiment of the present invention. Namely, to the terminal having even MAC index, RPC and DPRCLock information is transmitted via I-channel of the MAC channel and RCB information is transmitted via Q-channel. In doing so, timing for transmitting the RCB information may be fixed.

Namely, in case of using 8-slots as a length unit of one sub-packet, a location of the slot where the RCB is transmitted can be defined by Equation 3.

(T-FrameOffset) mod 8=2 and 3 [Equation 3]

In Equation 3, 'T' is a system time of slot time unit and FrameOffset is a value between 0~7 to indicate a relative offset of reverse frame. Referring to Equation 3, the slot where the RCB is transmitted is fixed to second and third slots when each slot of the MAC channel is counted using a modulo of 0~8. In this case, a pair of slots are allocated to transmit one RCB. This is to enable the terminal to detect the RCB more accurately. Hence, one slot may be allocated to transmit the RCB as well.

The RCB transmitting method via MAC channel is summarized as follows. First of all, '1' or '−1' is generated if the RCB symbol indicates 'UP'. '−1' or '1' is generated if the RCB symbol indicates 'DOWN'. In case of 'HOLD', 'gate-off' occurs. Meanwhile, a transmission time point of the RCB is decided as '2' and '3' by Equation 3. In case of even MAC index, the RCB is transmitted via Q-channel while RPC (Reverse Power Control) bit and DRCLock information are transmitted via I-channel. In case of odd MAC index, the RCB is transmitted via I-channel while RPC (Reverse Power Control) bit and DRCLock information are transmitted via Q-channel.

If the generated RCB symbol indicates 'UP' or 'DOWN', the RPC bit becomes 'gate-off' (17) and entire overhead power able to be allocated to the RPC bit is allocated to the RCB bit at the second and third slots according to Equation 3. Meanwhile, if the generated RCB symbol indicates 'HOLD', the RPC bit transmitted via the MAC channel becomes 'gate-off' (13) and the RPC is normally transmitted in the second and third slots according to Equation 3 (14).

The base station, as shown in FIG. 2, receives packet 0 (15) and performs decoding on the packet 0 for a pair of slot sections (2*1.666 ms) (16). In accordance with success/failure of the decoding in the base station, ACK or NAK signal is transmitted to the terminal via MAC channel.

In case of transmitting ACK/NAK signal, it is able to use On/Off Keying. Namely, in FIG. 2, it is mapped to the signal point of '+1' in case of NAK only. And, it becomes 'gate-off' in case of ACK. On the other hand, it may be mapped to the signal point of '+1) only. And, it may become 'gate-off' in case of NAK. In doing so, slot timing for transmitting ACK/NAK signal and a phase value of MAC channel is fixed. Namely, ACK/NAK signal is transmitted via Q-channel for even MAC index and RPC and DRCLock information are transmitted via I-channel. Meanwhile, for odd MAC index, ACK/NAK signal is transmitted via I-channel and RPC and DRCLock information are transmitted via Q-channel.

On MAC channel, slot timing for transmitting ACK/NAK signal is decided by Equation 4.

(T-FrameOffset) mod 8=4 and 5 [Equation 4]

In Equation 4, 'T' represents a system time by slot time unit and 'FrameOffset' is a value between 0~7 to indicate a relative offset of reverse frame.

Referring to Equation 4, a slot where ACK/NAK signal is transmitted is fixed to fourth and fifth slots when each slot of MAC channel is counted using modulo of 0~8. In doing so, a pair of slots are allocated to transmit one RCB. This is to enable the terminal to detect the RCB more accurately. Hence, one slot may be allocated to transmit the RCB as well.

The ACK/NAK signal transmitting method via MAC channel is summarized as follows. First of all, the ACK/NAK symbol is generated in a manner that it becomes 'gate-off' (or 1) in case of ACK and that it becomes '1' (or 'gate-off') in case of NAK. Meanwhile, a transmission time point of the ACK/NAK symbol is decided as '4' and '5' by Equation 4. In case of even MAC index, ACK/NAK signal is transmitted together with RCB signal via Q-channel by TDM (Time Division Multiplexing). Meanwhile, RPC bit and DRCLock information are transmitted via I-channel. On the contrary, in case of odd MAC index, the ACK/NAK signal and the RCB signal are transmitted via I-channel and the previous RPC bit and the DRCLock information are transmitted Q-channel. Moreover, in case that the ACK/NAK symbol is NAK only, a symbol of '+1' is transmitted for the fourth and fifth slot sections according to Equation 4 (19) while the RPC bit becomes 'gate-off' for the fourth and fifth slot sections (20).

If the generated symbol is ACK (or NAK), a value of Q-channel (in case of even MAX index) or I-channel (in case of odd MAC index) for the fourth and fifth slot sections according to Equation 4 becomes 'gate-off' while the RPC symbols are normally transmitted for the fourth and fifth slot sections.

Referring to FIG. 2, having received the packet 0, the base station transmits NAK if failing in decoding (21). For the slot section where the NAK is transmitted (19), it can be known that the transmission of the RPC is 'gate-off' (20). The terminal receives the RCB signal transmitted by the base station and then decodes it to decide a data rate for transmission of a next sub-packet section.

Referring to FIG. 2, the terminal receives the 'UP' symbol and applied it thereto, whereby it can be known that the data rate of the transmission of packet 2 is increased higher than that of the packet 0 (22). Meanwhile, the terminal receives ACK/NAK signal transmitted from the base station, decodes it, and then decided whether to retransmit the sub-packet. If the signal transmitted from the base station is NAK, retransmission packet for the packet 0 is transmitted via R-RPDCH (23).

Considering energy reduction HARQ, the value of a traffic to power ratio used in initial transmission is partially used for retransmission in the embodiment of the present invention. Through such a process, the dedicated type rate control and energy reduction HARQ operate.

In the embodiment of the present invention, it is assumed that a delay required for the HARQ process is 16-slots. Namely, a time point of retransmitting the sub-packet having been transmitted from a $T^{th}$ slot is (T+16). Hence, within 4-slots after reception of the sub-packet, ACK or NAK signal for the corresponding sub-packet should be generated to be ready for transmission. For this, the base station needs fast decoding for the sub-packet. Yet, in case of having difficulty performing the fast decoding, the delay required for the HARQ process can be set to 24-slots. Namely, the time point of retransmitting the sub-packet having been transmitted at the slot time T can be set to (T+24). In doing so, within 12-slots after reception of the sub-packet, ACK or NAK signal for the corresponding sub-packet should be generated to be ready for transmission.

Referring to FIG. 2, the terminal needs to preferentially detect energy of the RCB bit at a specific slot that returns periodically. If MAC index of the terminal is an even number, the terminal detects the energy in the second slot section via (T-Frame Offset) mod 8 of Q-branch of the MAC channel. If the energy detected in the second slot section is lower than a specific threshold, the terminal decides that the RPC value of I-branch for the second and third slot sections is valid using the (T-Frame Offset) mod 8 and then interprets the power control command according to hard decision of the value. Meanwhile, if MAC index of the terminal is an odd number, roles of the I-branch and Q-branch are switched to each other.

The terminal detects energy of ACK/NACK signal for a specific slot time periodically. In FIG. 2, if MAC index of the terminal is an even number, the terminal detects the energy of the fourth slot section via (T-Frame Offset) mod 8 of Q-branch of the MAC channel. If the energy detected in the second slot section is lower than a specific threshold, the terminal decides that the RPC value of I-branch for the fourth and fifth slot sections is valid according to the (T-Frame Offset) mod 8 and then interprets the power control command according to hard decision on the RPC value. Meanwhile, if MAC index of the terminal is an odd number, roles of the I-branch and Q-branch are switched to each other.

Figure 3:
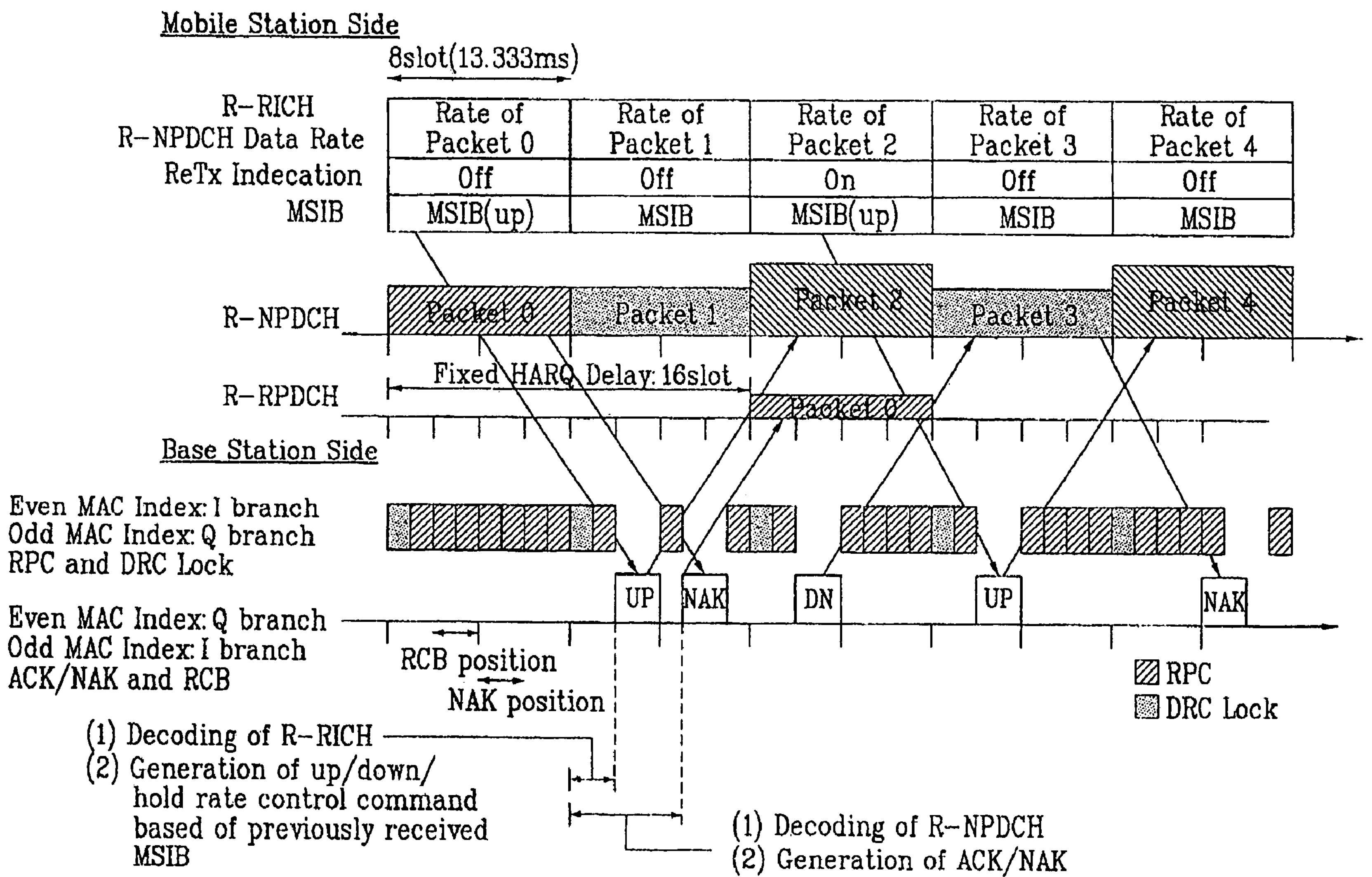
FIG. 3 is a diagram of a control information transmitting method according to a second embodiment of the present invention.

FIG. 3 is a diagram of a control information transmitting method according to a second embodiment of the present invention. In case that the NAK signal, as shown in FIG. 2, is transmitted together with the 'UP' or 'DOWN' signal in the 8-slots, the RPC channel enables to become 'gate-off' continuously. Thus, if the RPC bit becomes 'gate-off' continuously, efficiency of reverse power control may be degraded. The second embodiment of the present invention relates to a control information transmitting method considering the efficiency of the reverse power control.

Referring to FIG. 3, a slot section for transmitting NAK signal is separated from a slot section for transmitting RCB signal. A transmission slot section for ACK/NAK signal is decided by Equation 5.

(T-Frame Offset) mod 8=5 and 6 [Equation 5]

Once the ACK/NAK signal is transmitted using a slot section decided according to Equation 5, it is able to prevent the RPC from becoming 'gate-off' continuously for four slot sections.

Figure 4:
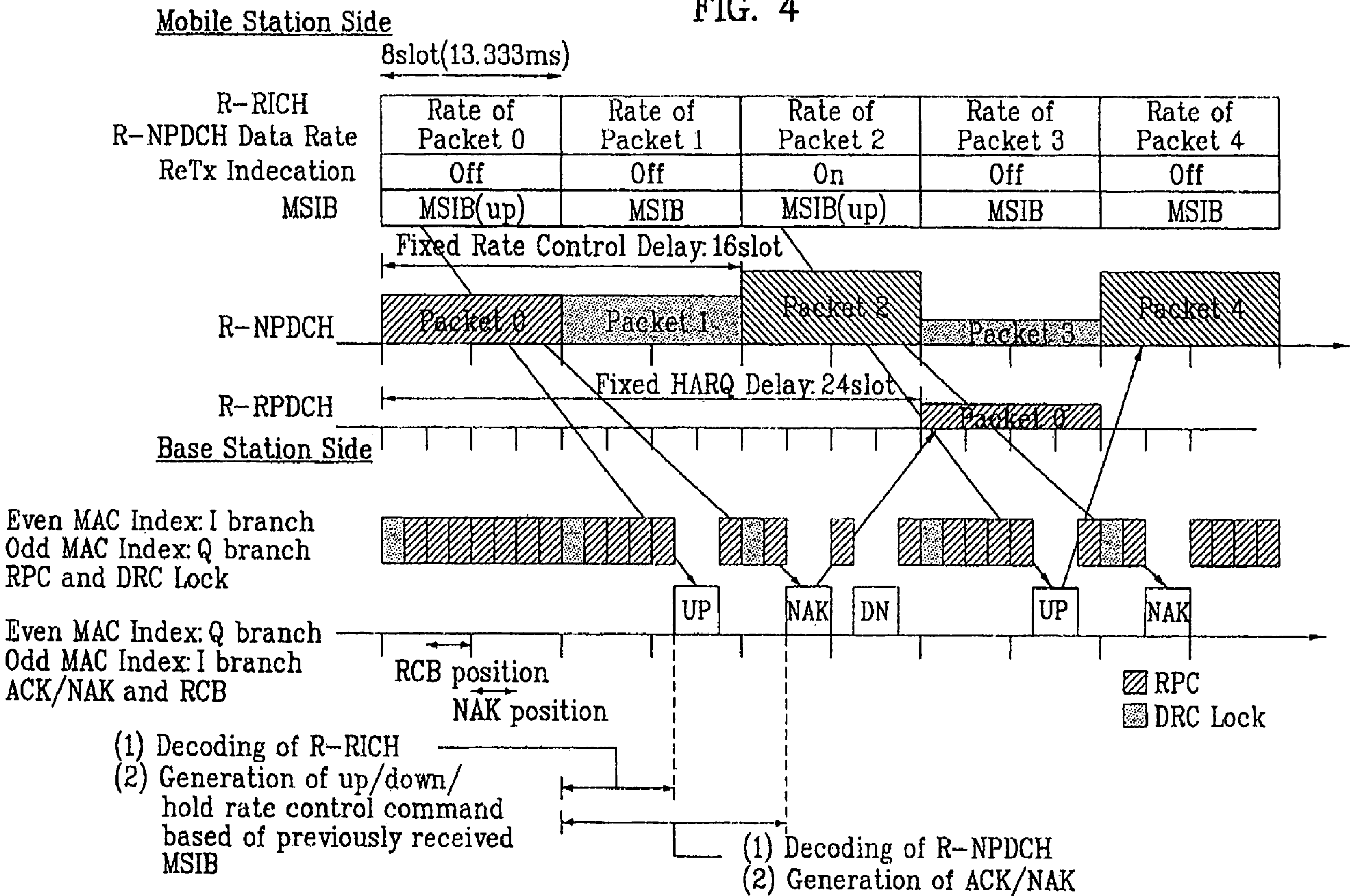
FIG. 4 is a diagram of a control information transmitting method according to a third embodiment of the present invention.

FIG. 4 is a diagram of a control information transmitting method according to a third embodiment of the present invention. In the first and second embodiments of the present invention, decoding is carried out on the received packet and a time taken to generate the ACK/NAK signal according to a result of the decoding should not exceed four slots. Hence, a burden is imposed on the receiving hardware of the base station.

Referring to FIG. 4, in the third embodiment of the present invention, a time delay used in HARQ is a fixed delay of 24-slots. Yet, a time delay for rate control is 16-slots. Moreover, after reception of packet, a base station enables to have a time corresponding to ten slot sections in generating to transmit NAK signal. A transmission slot section for ACK/NAK signal is second and third slots according to (T-Frame Offset) mod 8 in Equation 3. Moreover, a transmission slot section for RCB signal is fifth and sixth slots according to (T-Frame Offset) mod 8 in Equation 5.

Figure 5:
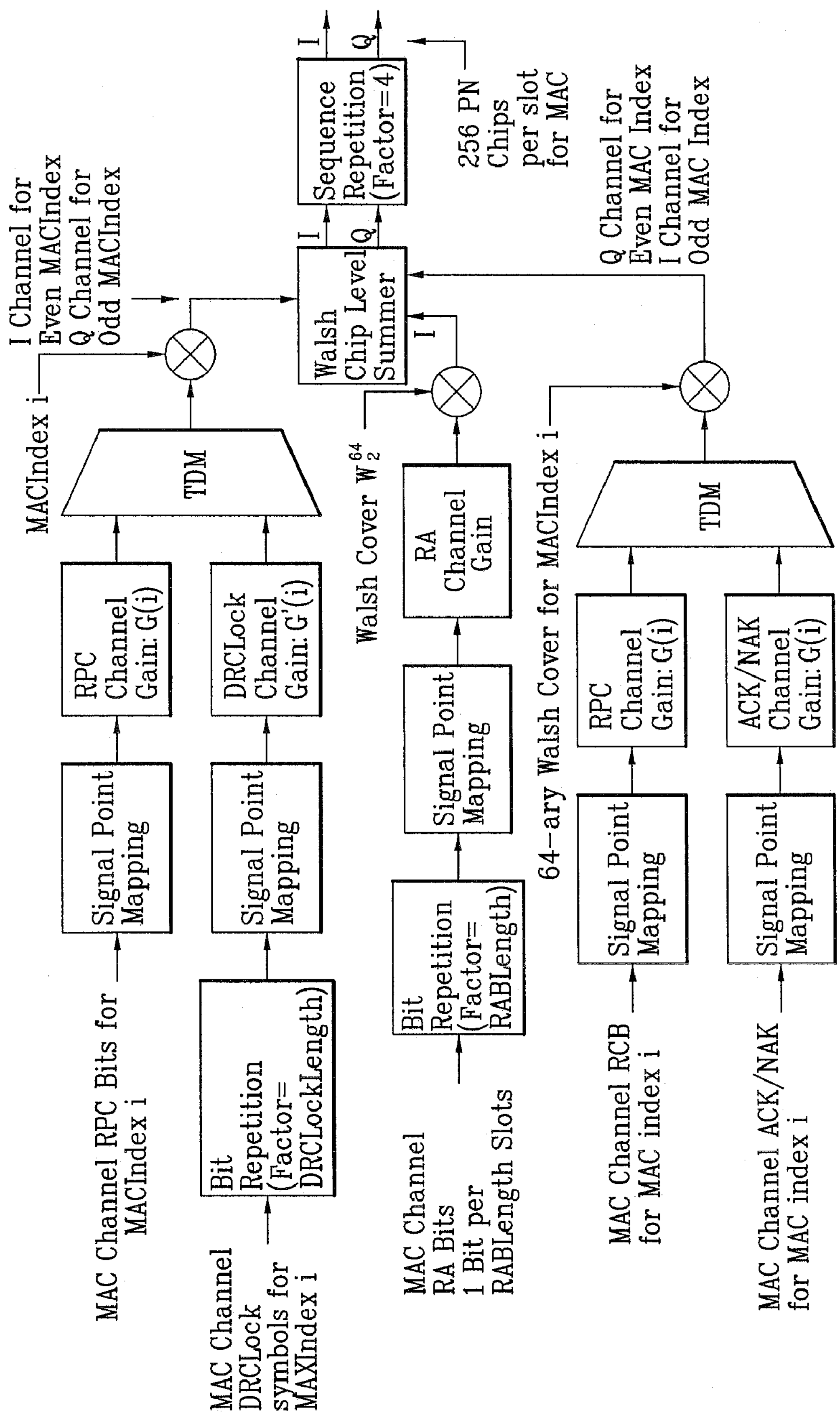
FIG. 5 is a block diagram of MAC channel according to the present invention.

FIG. 5 is a block diagram of MAC channel according to the present invention. FIG. 5 shows a structure of the MAC channel according to the first embodiment of the present invention in FIG. 2, assuming that a unit length of sub-packet is 8-slots.

Accordingly, the dryer according to the present invention has the following advantages of effects. First of all, the ACK/NAK signal according to addition of the HARQ process and the RCB signal for the dedicated type data rate control are used in addition, whereby the present invention enables to render the previous MAC channel by QPSK into application. And, the RPC bit transmitted over the previous MAC channel is replaced to transmit.

Although the description of the first to third embodiments of the present invention is based on the first generation CDMA 2000 mobile communications system, 1XEV-DO, it will be apparent to those skilled in the art that various modifications and variations can be made in the present invention without departing from the spirit or scope of the invention. Thus, it is intended that the present invention cover such modifications and variations, provided they come within the scope of the appended claims and their equivalents.

What is claimed is:

1. In reverse link packet data transmission on MAC channel with period between a base station and a mobile station using hybrid automatic repeat request (HARQ), a method of transmitting control information, comprising:

transmitting reverse power control information in a first slot section to the mobile station;

making a decision of whether to increase or decrease a data rate of a reverse link packet using the control information received from the mobile station and transmitting rate control information corresponding to the decision in a second slot section, wherein the rate control information is represented by an RCB (rate control bit) symbol and the second slot section corresponds to (T-FrameOffset) mod8 =2 and 3, wherein if the RCB symbol indicates an increment of the data rate of the reverse link packet, it is mapped to '1', wherein if the RCB symbol indicates a decrement of the data rate of the reverse link packet, it is mapped to '−1', and wherein if the RCB symbol indicates 'unchanged' of the data rate of the reverse link packet, it becomes 'gate-off'; and decoding a sub-packet received from the mobile station and transmitting information of a success or failure result of decoding the sub-packet in a third slot section.

2. The method of claim 1, further comprising the step of transmitting DRCLock in a fourth slot section.

3. The method of claim 1, wherein if the MAC channel has an odd MAC index, the reverse power control information is transmitted via I-channel and the rate control information and the information of the success or failure result of decoding the sub-packet are transmitted via Q-channel, wherein if the MAC channel has an even MAC index, the reverse power control information is transmitted via Q-channel and the rate control information and the information of the success or failure result of decoding the sub-packet are transmitted via I-channel.

4. The method of claim 1, wherein the control information received from the mobile station includes a reverse data rate, whether to perform retransmission, and mobile status information bit(MSIB).

5. The method of claim 1, wherein the second and third slot sections have a time interval of at least one slot.

6. The method of claim 1, wherein the rate control information in the second slot section and the information in the third section are transmitted by ON/OFF keying and wherein if the second and third slot sections become 'gate-off', the power control information in the first section is transmitted.

7. In reverse link packet data transmission with period between a base station and a mobile station, a method of transmitting control signals, comprising:

receiving state information of the mobile station via a reverse rate indication channel (R-RICH);

generating a rate control bit (RCB) using the state information of the mobile station, wherein if the RCB indicates an increment of a data rate of a reverse link packet, it is mapped to '1', wherein if the RCB indicates a decrement of the data rate of the reverse link packet, it is mapped to '−1', and wherein if the RCB indicates 'unchanged' of the data rate of the reverse link packet, it becomes 'gate-off';

transmitting the RCB to the mobile station via a medium access control (MAC) channel;

receiving a sub-packet via a reverse packet data channel (R-PDCH);

decoding the received sub-packet; and transmitting acknowledgement/negative acknowledgement (ACK/NAK) information to the mobile station according to a result of decoding the received sub-packet via the MAC channel.

8. The method of claim 7, further comprising the step of transmitting RPC via the MAC channel.

9. The method of claim 8, further comprising the step of transmitting DRCLock information via the MAC channel.

10. The method of claim 7, wherein if the MAC channel has an odd MAC index, the RCB and the ACK/NAK information are transmitted via Q-channel and wherein if the MAC channel has an even MAC index, the RCB and the ACK/NAK information are transmitted via I-channel.

11. In a reverse link packet data transmitting method having HARQ applied thereto, a method of transmitting reverse link packet data, comprising:

transmitting state information of a mobile station via a reverse rate indication channel (R-RICH);

receiving data rate control information transmitted from a base station via a medium access control (MAC) channel, wherein the data rate control information is represented by an RCB (rate control bit) symbol and the second slot section corresponds to (T-FrameOffset) mod8=2 and 3, wherein if the RCB symbol indicates an increment of the data rate of the reverse link packet, it is mapped to '1', wherein if the RCB symbol indicates a decrement of the data rate of the reverse link packet, it is mapped to '−1', and wherein if the RCB symbol indicates 'unchanged' of the data rate of the reverse link packet, it becomes 'gate-off';

transmitting a sub-packet via a reverse packet data channel (R-PDCH) according to the data rate control information;

receiving acknowledgement/negative acknowledgement (ACK/NAK) information via the MAC channel; and retransmitting the sub-packet if the NAK information is received.

12. In reverse link packet data transmission using hybrid automatic repeat request(HARQ), a method of transmitting control signals from a base station to a mobile station, comprising:

receiving mobile status information transmitted from the mobile station;

deciding whether to increase a data rate of a reverse link packet using the mobile status information; and transmitting rate control information corresponding to a result of the deciding step via a medium access channel, wherein the rate control information is represented by an RCB(rate control bit) symbol and is transmitted in a slot section corresponding to (T-FrameOffset) mod8=2 and 3, wherein if the RCB symbol indicates an increment of the data rate of the reverse link packet, it is mapped to '1', wherein if the RCB symbol indicates a decrement of the data rate of the reverse link packet, it is mapped to '−1', and wherein if the RCB symbol indicates 'unchanged' of the data rate of the reverse link packet, it becomes 'gate-off'.

13. The method of claim 12, wherein the mobile status information is transmitted using MSIB (mobile status information bit).

14. The method of claim 12, wherein if the MAC channel has an odd MAC index, the rate control information is transmitted via Q-channel, wherein if the MAC channel has an even MAC index, the rate control information is transmitted via I-channel.

15. In reverse link packet data transmission using HARQ (hybrid automatic repeat request) having a fixed 24slots HARQ delay, a method of transmitting control information from a base station to a mobile station on MAC channel with period, comprising:

transmitting reverse power control information in a first slot section to the mobile station;

making a decision of whether to increase or decrease a data rate of a reverse link packet using the control information received from the mobile station and transmitting rate control information corresponding to the decision in a second slot section, wherein the rate control information is represented by an RCB(rate control bit) symbol and the second slot section corresponds to (T-FrameOffset) mod8=2 and 3, wherein if the RCB symbol indicates an increment of the data rate of the reverse link packet, it is mapped to '1', wherein if the RCB symbol indicates a decrement of the data rate of the reverse link packet, it is mapped to '1', and wherein if the RCB symbol indicates 'unchanged' of the data rate of the reverse link packet, it becomes 'gate-off'; and decoding a sub-packet received from the mobile station and transmitting information of a success or failure result of decoding the sub-packet in a third slot section.

16. The method of claim 15, further comprising the step of transmitting DRCLock in a fourth slot section.

17. The method of claim 15, wherein if the MAC channel has an odd MAC index, the reverse power control information is transmitted via I-channel and the rate control information and the information of the success or failure result of decoding the sub-packet are transmitted via Q-channel, wherein if the MAC channel has an even MAC index, the reverse power control information is transmitted via Q-channel and the rate control information and the information of the success or failure result of decoding the sub-packet are transmitted via I-channel.

18. The method of claim 15, wherein the control information received from the mobile station includes a reverse data rate, whether to perform retransmission, and mobile status information bit(MSIB).

19. In reverse link packet data transmission on MAC channel with period between a base station and a mobile station using hybrid automatic repeat request (HARQ), a method of transmitting control information, comprising:

transmitting mobile status information to the base station;

receiving rate control information corresponding to the mobile status information from the base station, wherein the rate control information is represented by an RCB (rate control bit) symbol and the second slot section corresponds to (T-FrameOffset) mod8=2 and 3, wherein if the RCB symbol indicates an increment of the data rate of the reverse link packet, it is mapped to '1', wherein if the RCB symbol indicates a decrement of the data rate of the reverse link packet, it is mapped to '1', and wherein if the RCB symbol indicates 'unchanged' of the data rate of the reverse link packet, it becomes 'gate-off'; and receiving information of a success or failure result of decoding a transmitted packet.

* * * * *